United States Patent
Ueguri

(10) Patent No.: US 9,992,405 B2
(45) Date of Patent: Jun. 5, 2018

(54) IMAGE CAPTURE CONTROL APPARATUS AND CONTROL METHOD OF THE SAME

(71) Applicant: CANON KABUSHIKI KAISHA, Tokyo (JP)

(72) Inventor: Toshiaki Ueguri, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 49 days.

(21) Appl. No.: 15/189,537

(22) Filed: Jun. 22, 2016

(65) Prior Publication Data

US 2016/0381281 A1  Dec. 29, 2016

(30) Foreign Application Priority Data

Jun. 24, 2015  (JP) .................... 2015-126870

(51) Int. Cl.
  *H04N 5/232* (2006.01)
  *H04N 5/235* (2006.01)

(52) U.S. Cl.
  CPC ....... *H04N 5/23212* (2013.01); *H04N 5/2353* (2013.01); *H04N 5/23216* (2013.01); *H04N 5/23219* (2013.01); *H04N 5/23245* (2013.01); *H04N 5/23293* (2013.01); *H04N 5/23296* (2013.01)

(58) Field of Classification Search
  CPC ............ H04N 5/23212; H04N 5/2353; H04N 5/23245; H04N 5/23219; H04N 5/23296; H04N 5/23293; H04N 5/23216
  See application file for complete search history.

(56) References Cited

U.S. PATENT DOCUMENTS

2017/0064188 A1\* 3/2017 Yoshida ............. H04N 5/23212

FOREIGN PATENT DOCUMENTS

JP  2013-201527 A  10/2013

\* cited by examiner

*Primary Examiner* — Twyler Haskins
*Assistant Examiner* — Angel L Garces-Rivera
(74) *Attorney, Agent, or Firm* — Carter, DeLuca, Farrell & Schmidt, LLP

(57) ABSTRACT

An image capture control apparatus comprises a display control unit that performs control so as to display, on a display unit, a live view image captured by an image capturing unit in any of a plurality of display states that include normal magnification display and enlarged display that is enlarged more than the normal magnification display, and a control unit that performs control so as to, in a case where a first operation is performed during the enlarged display of the live view image, switch to the normal magnification display and execute AF processing based on a first AF method, and in a case where a second operation is performed during the enlarged display of the live view image, maintain the enlarged display and execute AF processing based on a second AF method.

20 Claims, 7 Drawing Sheets

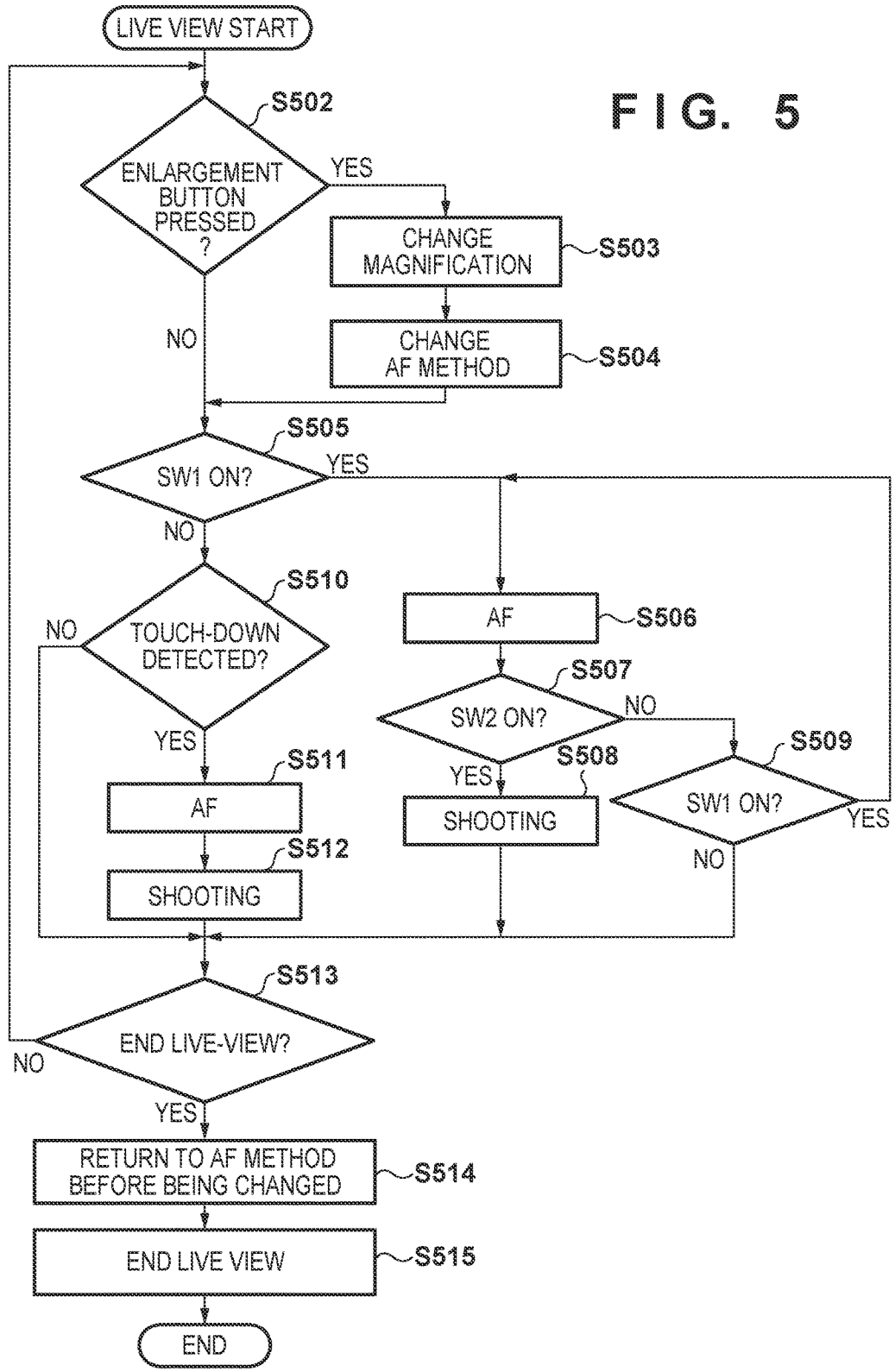

IMAGE CAPTURE CONTROL APPARATUS AND CONTROL METHOD OF THE SAME

BACKGROUND OF THE INVENTION

Field of the Invention

The present invention relates to AF (automatic focus) processing and a shooting operation during enlarged display.

Description of the Related Art

In recent years, image capturing apparatuses that can enlarge a live view image and display it during live view shooting are known. Japanese Patent Laid-Open No. 2013-201527 describes a technique for automatically determining, based on an AF method or an AF frame, whether to perform AF processing while maintaining enlarged display or perform AF processing after switching from enlarged display to unmagnified display. Specifically, in a live single-point AF mode in which a selected AF frame is always within the enlarged display, AF processing is performed while maintaining the enlarged display. On the other hand, in an AF mode (e.g., a live multi-point AF mode and a quick AF mode) in which an AF frame is not always within the enlarged display, if an AF operation is performed while maintaining the enlarged display, a user cannot confirm whether or not the object is in focus as a result of the AF operation, or the user cannot visually recognize the state of a main object near the AF frame and cannot confirm a shooting opportunity. Therefore, in the AF mode in which the AF frame is not always within the enlarged display, AF processing is performed after switching from enlarged display to unmagnified display.

In the above-described AF processing and shooting operation during enlarged display in live view, in the case where there is a desire to perform AF processing and shooting while maintaining the enlarged display, the user needs to change the current AF method to an AF method according to which AF processing can be performed while maintaining the enlarged display, and perform an operation for returning the AF method to the original state after shooting.

SUMMARY OF THE INVENTION

The present invention has been made in consideration of the aforementioned problems, and realizes a technique that makes it possible to perform AF processing while maintaining enlarged display without performing a bothersome operation in order to change the current AF method to an AF method suitable for enlarged display.

In order to solve the aforementioned problems, the present invention provides an image capture control apparatus comprising: a display control unit configured to perform control so as to display, on a display unit, a live view image captured by an image capturing unit in any of a plurality of display states that include normal magnification display and enlarged display that is enlarged more than the normal magnification display; and a control unit configured to perform control so as to, in a case where a first operation is performed during the enlarged display of the live view image, switch to the normal magnification display and execute AF processing based on a first AF method, and in a case where a second operation is performed during the enlarged display of the live view image, maintain the enlarged display and execute AF processing based on a second AF method.

In order to solve the aforementioned problems, the present invention provides a control method of an image capture control apparatus, comprising: performing control so as to display, on a display unit, a live view image captured by an image capturing unit in any of a plurality of display states that include normal magnification display and enlarged display that is enlarged more than the normal magnification display; and performing control so as to, in a case where a first operation is performed during the enlarged display of the live view image, switch to the normal magnification display and execute AF processing based on a first AF method, and in a case where a second operation is performed during the enlarged display of the live view image, maintain the enlarged display and execute AF processing based on a second AF method.

In order to solve the aforementioned problems, the present invention provides a non-transitory computer-readable storage medium storing a program for causing a computer to function as a display control unit and control unit of an image capture control apparatus, wherein the display control unit performs control so as to display, on a display unit, a live view image captured by an image capturing unit in any of a plurality of display states that include normal magnification display and enlarged display that is enlarged more than the normal magnification display, and the control unit performs control so as to, in a case where a first operation is performed during the enlarged display of the live view image, switch to the normal magnification display and execute AF processing based on a first AF method, and in a case where a second operation is performed during the enlarged display of the live view image, maintain the enlarged display and execute AF processing based on a second AF method.

According to the present invention, AF processing can be performed while maintaining enlarged display, without performing a bothersome operation in order to change the current AF method to an AF method suitable for enlarged display.

Further features of the present invention will become apparent from the following description of exemplary embodiments (with reference to the attached drawings).

BRIEF DESCRIPTION OF THE DRAWINGS

FIG. 5 is a flowchart showing a shooting operation during enlarged display in a live view according to a first embodiment.

DESCRIPTION OF THE EMBODIMENTS

Embodiments upon application of the present invention to an image capturing apparatus such as a digital single-lens reflex camera for shooting a still image and/or moving image will be described in detail hereinafter with reference to the drawings.

First Embodiment

The present embodiment has a configuration in which AF processing and a shooting operation are performed after automatically switching to an AF method suitable for enlarged display in a live view, and after shooting, this AF method is automatically returned to the original AF method.

Apparatus Configuration

The configuration and functions of a digital camera according to the present embodiment will be described below with reference to FIG. 1A to FIG. 2.

The external configuration of the digital camera (referred to as "camera" below) 100 according to the present embodiment will be described first with reference to FIGS. 1A and 1B.

Figure 1A:
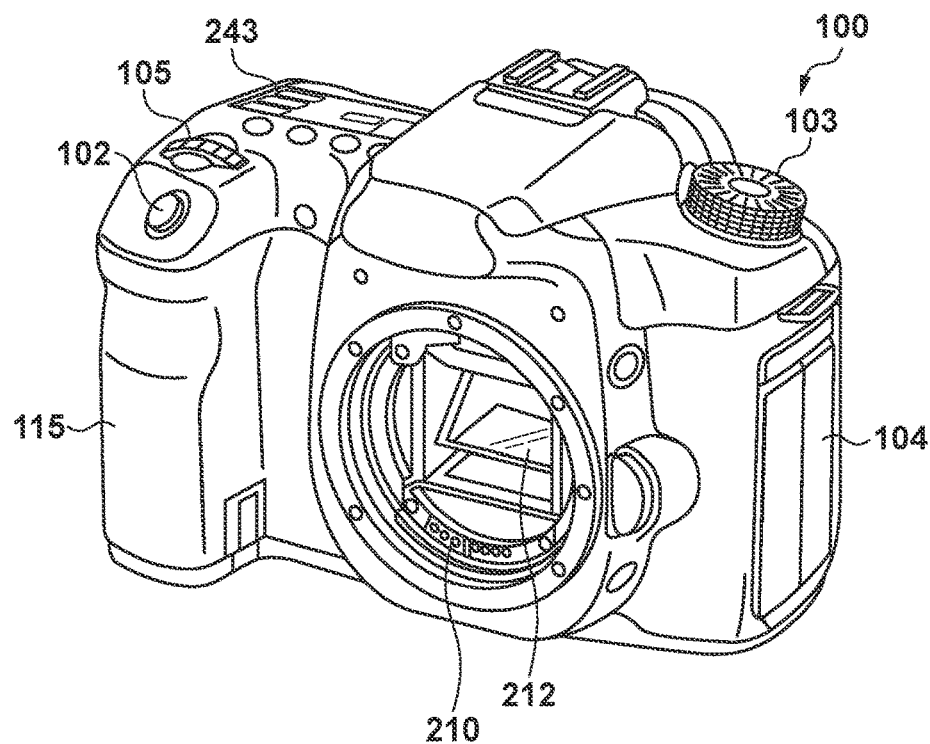
FIGS. 1A and 1B show the outer appearance of a digital camera of the present embodiment.
Figure 1B:
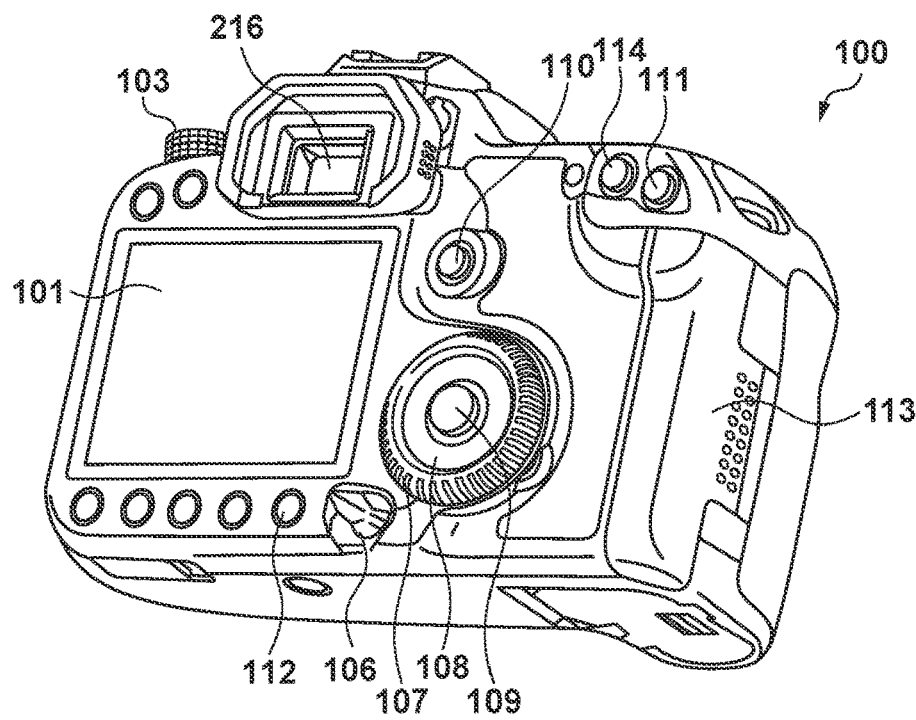

FIG. 1A is a front perspective view of the camera 100, and FIG. 1B is a back perspective view of the camera 100.

In FIGS. 1A and 1B, a display unit 101 is a display device for displaying images and various types of information, such as an LCD. Moreover, the display unit 101 has a function of reproducing a still image after the still image was shot, a function of displaying a moving image that is being recorded, and a live view display (through-the-lens display) function as well. An out-of-finder display unit 243 is a display device such as an LCD provided on the upper surface of the camera body, and displays various setting values of the camera such as a shutter speed and a diaphragm aperture.

A shutter button 102 is an operation unit for giving a shooting instruction. A mode change-over switch 103 is a dial type operation unit for switching between various modes. A terminal cover 104 is a cover member for protecting a connector (not illustrated) for connecting an external device and the camera 100 via a cable such as a USB cable. A main electronic dial 105 is a rotating operation member included in operation units 270 that will be described later with reference to FIG. 2, and by rotating this main electronic dial 105, setting values such as a shutter speed and a diaphragm aperture can be changed.

A power supply switch 106 is an operation member for the switching on/off of the power supply to the digital camera 100. A sub electronic dial 107 is also a rotating operation member included in the operation units 270 that will be described later with reference to FIG. 2, and can move a selected frame, advance images, and the like. A cross key 108 is a movement instruction member also included in the operation units 270 that will be described later with reference to FIG. 2, and can perform, by one of UP, DOWN, LEFT and RIGHT being pressed down, an operation that corresponds to the pressed portion of the cross key 108.

A SET button 109 is a push button also included in the operation units 270 that will be described later with reference to FIG. 2, and is mainly used for determining selection items, and the like. A live view button 110 is also a push button included in the operation units 270 that will be described later with reference to FIG. 2, is used for the switching on/off of live view display in a still image shooting mode, and is used for giving an instruction to start or stop moving image shooting (recording) in a moving image recording mode. An enlargement button 111 is also a push button included in the operation units 270 that will be described later with reference to FIG. 2, and is an operation member for the switching on/off of enlarged display in a live view and changing the magnification during the enlarged display. In addition, the enlargement button 111 is an operation member for enlarging a reproduced image and increasing the magnification in a reproduction mode. A reduction button 114 is also a push button included in the operation units 270 that will be described later, and is an operation member for reducing the magnification of a reproduced image that is enlarged, and displays a screen in a reduced state.

A reproduction button 112 is also a push button included in the operation units 270 that will be described later with reference to FIG. 2, and is an operation member for switching between a shooting mode and the reproduction mode. By pressing the reproduction button 112 in the shooting mode, the current mode can be shifted to the reproduction mode, and the most recent image among images recorded in a recording medium 250 that will be described later with reference to FIG. 2 can be displayed on the display unit 101.

A quick return mirror 212 is driven to an upward position (an exposure position) or a downward position (a live view position) by an actuator (not illustrated) in accordance with an instruction from a system control unit 201 that will be described later with reference to FIG. 2. A communication terminal 210 is an electric contact for the camera 100 to perform communication with a lens unit 200 (FIG. 2). A look-in eyepiece finder 216 is an optical member for checking, by observing a focusing screen 213 (FIG. 2), the focus and composition of the optical image of an object taken in through the lens unit 200. A lid 113 is a member for opening or closing a slot for mounting/removing the recording medium 250 to/from the camera 100. A grip 115 has a shape that makes it easy to be grasped by a user's right hand when he or she holds the camera 100.

Next, the internal configuration of the camera 100 and lens unit 200 according to the present embodiment will be described with reference to FIG. 2.

Figure 2:
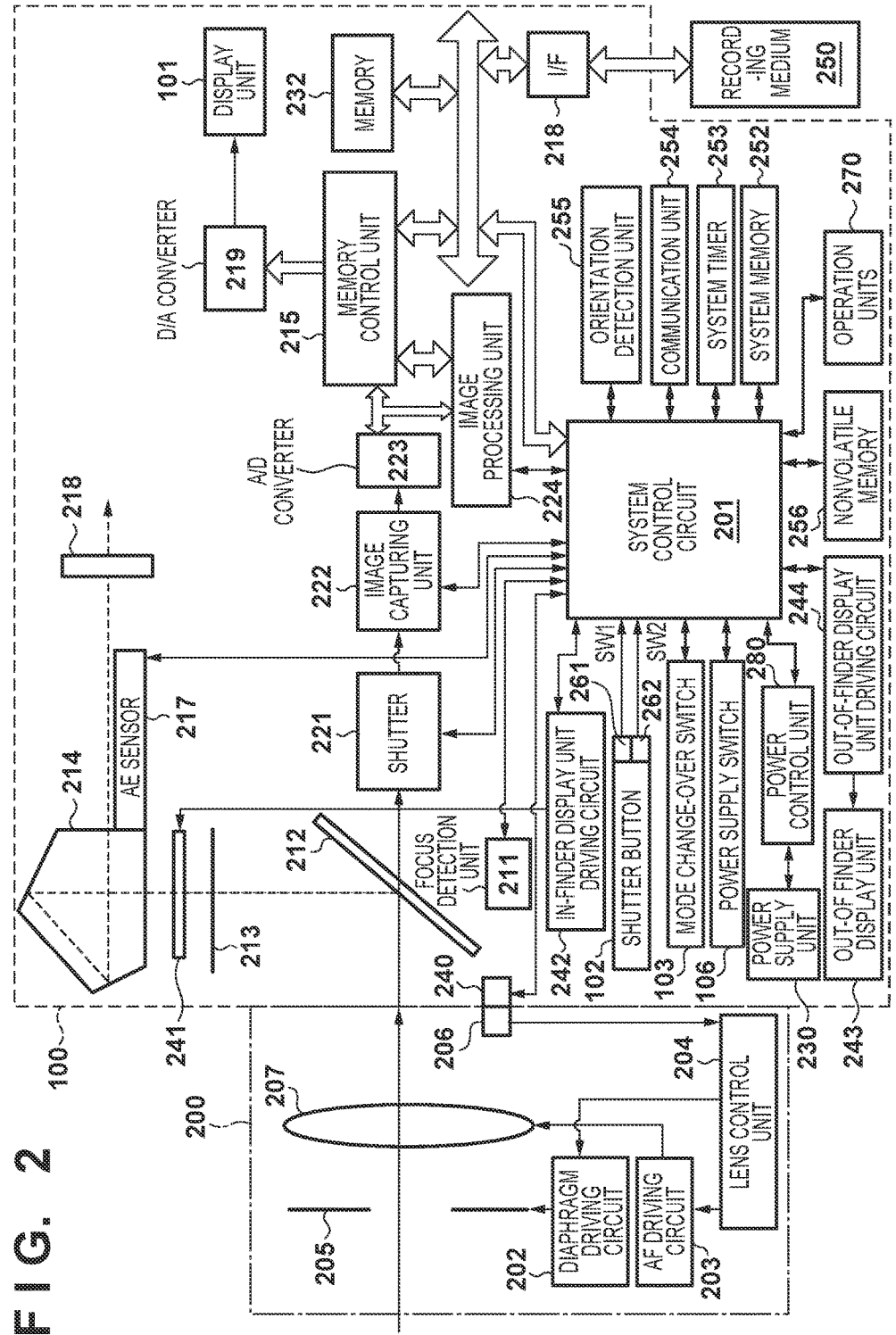
FIG. 2 shows the internal configuration of the digital camera of the present embodiment.

In FIG. 2, the lens unit 200 is equipped with a shooting lens 207, and is detachable from the camera 100. A shooting lens 207 is usually constituted by a plurality of lenses, but is simplified here and is shown by one lens only. A communication terminal 206 is an electric contact for the lens unit 200 to perform communication with the camera 100. The communication terminal 210 is an electric contact for the camera 100 to perform communication with the lens unit 200. The lens unit 200 performs communication with the system control unit 201 via the communication terminal 206, and a built-in lens control unit 204 controls a diaphragm driving circuit 202 so as to drive a diaphragm 205, and controls an AF driving circuit 203 so as to displace the position of the shooting lens 207, thereby bringing the object in focus.

An AE sensor 217 performs photometry to obtain the luminance of the object taken in through the lens unit 200. A focus detection unit 211 outputs a defocus amount to the system control unit 201, and the system control unit 201 communicates with the lens unit 200 in accordance with the defocus amount, and performs AF control using a phase difference detection system.

The quick return mirror (hereinafter, referred to as a mirror) 212 receives an instruction from the system control unit 201 at the time of exposure, live view display, and moving image shooting, and is driven to the upward position or the downward position by the actuator (not illustrated). The quick return mirror 212 switches luminous flux entering the shooting lens 207 to the eyepiece finder 216 or an image capturing unit 222. The quick return mirror 212 is usually biased toward the downward position so as to reflect the luminous flux and guide the luminous flux to the eyepiece finder 216, but for exposure and live view display, jumps upward and recedes from the luminous flux (to the upward position) so as to guide the luminous flux to the image capturing unit 222. In addition, the central portion of the quick return mirror 212 is a half mirror such that a portion of the luminous flux passes through and enters the focus detection unit 211. The photographer can check, via a pentagonal prism 214 and the eyepiece finder 216, the focus and composition of the optical image of the object taken in through the lens unit 200 by observing the focusing screen 213.

A focal plane shutter 221 can freely control the exposure time of the image capturing unit 222 in accordance with an instruction from the system control unit 201. The image capturing unit 222 is an image sensor constituted by an imaging element such as a CCD or a CMOS for converting the optical image of an object into electrical signals. An A/D converter 223 converts analog signals output from the image capturing unit 222 into digital signals and generates image data.

An image processing unit 224 performs resizing processing, such as predetermined pixel interpolation and reduction, and color conversion processing, with respect to data from the A/D converter 223 or data from a memory control unit 215. Further, the image processing unit 224 performs predetermined calculation processing using the captured image data, and the system control unit 201 performs exposure control and distance measuring control based on the calculation results. Thus, AF (Automatic Focus) processing, AE (Automatic Exposure) processing, and EF (flash pre-emission) processing of TTL (Through the Lens) type are performed. Furthermore, the image processing unit 224 performs predetermined calculation processing using the captured image data, and AWB (Automatic White Balance) processing of TTL type is performed on the basis of the calculation results.

The digital data from the A/D converter 223 is directly written into a memory 232 via both the image processing unit 224 and the memory control unit 215 or via the memory control unit 215. The memory 232 stores the image data obtained from the image capturing unit 222 and converted into digital data by the A/D converter 223, and image display data to be displayed on the display unit 101. The memory 232 has a storage capacity that is sufficient for storing a predetermined number of still images as well as moving images and audio for a predetermined time period. The memory 232 also functions as a memory for image display (video memory).

A D/A converter 219 converts the image display data stored in the memory 232 into an analog signal and supplies the display unit 101 with the analog signal. The image display data that was written into the memory 232 is displayed by the display unit 101 via the D/A converter 219. The display unit 101 performs display in accordance with the analog signal from the D/A converter 219. In this manner, the digital signals stored in the memory 232 are converted into analog signals, and the analog signals are successively transmitted to the display unit 101 so as to be displayed thereon, making it possible to realize an electronic view finder (EVF) functionality and to perform live view display.

An AF frame that indicates a ranging point at which AF processing is currently performed, an icon that indicates the setting state of the camera, and the like are displayed on an in-finder display unit 241 via an in-finder display unit driving circuit 242.

Various setting values of the camera such as a shutter speed and a diaphragm aperture are displayed on the out-of-finder display unit 243 via an out-of-finder display unit driving circuit 244.

A nonvolatile memory 256 is, for example, an EEPROM, which is electrically erasable and recordable. In the nonvolatile memory 256, constants and programs, for example, for operating the system control unit 201 are stored. In this context, "programs" may refer to programs for executing various flowcharts that will be described later.

The system control unit 201 includes CPU or MPU for overall controlling the entire camera 100, and realizes, by executing the programs stored in the nonvolatile memory 256, the procedures of the flowchart that will be described later. A system memory 252 is, for example, a RAM and used also as a work memory where constants and variables for operating the system control unit 201, and the programs read out from the nonvolatile memory 256 are expanded. The system control unit 201 controls the memory 232, the D/A converter 219, the display unit 101, and the like, so as to perform display control. A system timer 253 is a timer circuit for measuring time periods for various types of controls and the time of an integrated clock.

The mode change-over switch 103, a first shutter switch 261, a second shutter switch 262, and the operation units 270 are operation members for inputting various types of instructions into the system control unit 201. The mode change-over switch 103 switches the operation mode of the system control unit 201 to any of a still image shooting mode, a moving image recording mode, and a reproduction mode. The still image shooting mode includes an automatic shooting mode, an automatic scene determination mode, a manual mode, an aperture-priority AE mode (Av mode), a shutter-priority AE mode (Tv mode), various scene modes in each of which scene-specific shooting setting is made, a program AE mode, a custom mode, and the like.

Using the mode change-over switch 103, the mode is directly switched to any of the plurality of modes included in the still image shooting mode. Alternatively, it is also possible to switch, using the mode change-over switch 103, to the still image shooting mode and then to switch, using another operation member, to any of the plurality of modes included in the still image shooting mode. Similarly, the moving image recording mode may also include a plurality of modes.

While the shutter button 102 provided on the camera 100 is being operated, that is, pressed half-way (the shooting preparation instruction), the first shutter switch 261 is turned on and generates a first shutter switch signal SW1. Upon receiving the first shutter switch signal SW1, the system control unit 201 causes the image processing unit 224 to start the AF (Automatic Focus) processing, the AE (Automatic Exposure) processing, the AWB (Automatic White Balance) processing, the EF (flash pre-emission) processing and the like.

When the operation of the shutter button 102 is completed, that is, the shutter button 102 is pressed fully (the shooting instruction), the second shutter switch 262 is turned on and generates a second shutter switch signal SW2. Upon receiving the second shutter switch signal SW2, the system control unit 201 starts a series of shooting processing from reading out the signal from the image capturing unit 222 to writing of image data to the recording medium 250.

By selecting various functional icons displayed on the display unit 101, appropriate functions for each situation are assigned to the operation units 270, and the operation units 270 thus act as various function buttons (soft buttons). Examples of these function buttons include an end button, a back button, an image scrolling button, a jump button, a narrow-down button, and an attribute change button. For example, a menu screen that enables various settings to be made is displayed on the display unit 101 by pressing a menu button. The user can make various settings intuitively by using the menu screen, which is displayed on the display unit 101, the cross key 108 and the SET button 109.

The operation units 270 are input units which accept a user operation and notify it to the system control unit 201, and include at least the following operation members: a shutter button 102, the main electronic dial 105, the power supply switch 106, the sub electronic dial 107, the cross key 108, the SET button 109, the live view button 110, the enlargement button 111, the reproduction button 112, and a reduction button 114.

A power control unit 280 is constituted by, for example, a battery detection circuit, a DC-DC converter, and a switch circuit for changing over the block to be supplied with power, and detects whether a battery has been inserted or not, the type of the battery, and the residual capacity thereof. Further, the power control unit 280 controls the DC-DC converter in accordance with the detection results and an instruction of the system control unit 201, and supplies a necessary voltage for a necessary length of time to each of the units including the recording medium 250.

A power supply unit 230 comprises a primary battery such as an alkaline battery or a lithium battery, a secondary battery such as an NiCd battery, an NiMH battery, or an Li-ion battery, or an AC adaptor. A recording medium interface (I/F) 218 is for interfacing with the recording medium 250 such as the memory card or hard disk. The recording medium 250 is a recording medium such as a memory card for recording shot images, and is constituted by a semiconductor memory, a magnetic disk, or the like.

A communication unit 254 performs transmitting/receiving video and sound to/from an external device communicably connected via a wireless antenna or wired cable. The communication unit 254 is also connectable to a wireless LAN (Local Area Network) and the Internet. The communication unit 254 can transmit an image (including a live view image) captured by the image capturing unit 222 and an image file recorded in the recording medium 250 to an external device, and receive an image file and other various kinds of information from an external device.

An orientation detection unit 255 detects the orientation of the camera 100 with respect to the gravity direction. In this case, based on the orientation detected by the orientation detection unit 255, it is possible to discriminate whether an image captured by the image capturing unit 222 has been shot by setting the camera 100 in the landscape or portrait orientation. The system control unit 201 can add information about the orientation detected by the orientation detection unit 255 to an image file of image data obtained by the image capturing unit 222, and rotate and record the captured image. An acceleration sensor, gyro sensor and the like may be used as an orientation detection unit 255.

Included among the operation units 270 is also a touch panel as a touch detecting unit capable of detecting a touch operation on the display unit 101. The touch panel and the display unit 101 can be constructed as a single integrated unit. For example, the touch panel is constructed in such a manner that the transmittance of light will not interfere with the display presented by the display unit 101, and it is attached to the uppermost layer of the display face of the display unit 101. In addition, input coordinates on the touch panel and display coordinates on the display unit 101 are correlated. As a result, a GUI can be constructed that makes it possible for the user to directly manipulate the screen displayed on the display unit 101. The system control unit 201 is capable of detecting the following operations performed by contact with the touch panel: touching of the panel using a finger or pen (referred to as "touch-down" below); a state in which the touch panel is in contact with a finger or pen (referred to as "touch-on" below); movement of a finger or pen while in contact with the touch panel (referred to as "touch-move" below); lifting of a finger or pen that has been in contact with the touch panel (referred to as "touch-up" below); and a state in which the touch panel is not being touched at all (referred to as "touch-off" below).

When touch-down is detected, the touch-on state is also detected at the same time. Unless touch-up is detected after touch-down, touch-on usually continues to be detected. Touch-move is also detected in a state where touch-on is being detected. Even if touch-on is being detected, touch-move is not detected unless the touch position moves. After touch-up of all the fingers or a pen that have been in contact is detected, the touch-off state is entered.

These operations and position coordinates at which the touch panel is being touched by the finger or pen are communicated to the system control unit 201 through an internal bus and, based upon the information thus communicated, the system control unit 201 determines what kind of operation was performed on the touch panel. As for "touch-move", the determination can be made also for every vertical component and horizontal component with regard to the direction of movement of the finger or pen, which is moved on the touch panel, based upon a change in the coordinate position. Further, it is assumed that a stroke has been made when "touch-up" is performed following a regular "touch-move" after a "touch-down" on the touch panel. A very quick stroke action is referred to as a "flick". A "flick" is an operation in which, with fingers in contact with the touch panel, the fingers are moved rapidly over a certain distance and then lifted. In other words, this is a rapid tracing operation in which the fingers are flicked across the surface of the touch panel. The system control unit 201 can determine that a "flick" has been performed when it detects such movement over a predetermined distance or greater and at a predetermined speed or greater and then detects "touch-up". Further, the system control unit 201 can determine that "drag" has been performed if it detects movement over a predetermined distance or greater at a speed less than a predetermined speed.

The touch panel may employ a method that relies upon any of the following: resistive film, electrostatic capacitance, surface acoustic waves, infrared radiation, electromagnetic induction, image recognition and optical sensing.

The camera 100 according to the present embodiment can perform finder shooting based on phase difference AF and live view shooting based on image capturing plane AF.

Image capturing plane AF includes AF methods such as arbitrary single-point AF, multi-point AF, and face AF.

Central arbitrary single-point AF refers to performing AF processing on one central arbitrary position within the shooting screen. In addition, as an AF frame, one region having a specified size can be arbitrarily designated from a wide-range region in a live view image (a through-the-lens image). The arbitrary AF frame can be designated using an operation unit 270, and by performing touch-down on the display unit 101 as well, the arbitrary AF frame can be designated. In a live view, it is possible to match the AF frame with the screen during enlarged display, and thus AF processing and a shooting operation are possible while maintaining the enlarged screen.

Multi-point AF refers to performing AF processing after determining, as an AF frame, a region in which focusing processing is to be automatically performed, from a region within the shooting screen. In addition, the region in which focusing processing is to be automatically performed is determined from a wide-range region in a live view display screen, and thus an AF frame cannot be designated. All the AF frames are not included during enlarged display in the live view, and AF processing is performed on a limited portion of AF frames, making it impossible to perform AF processing and a shooting operation while maintaining the enlarged display.

The user can set any AF method out of these AF methods using an AF method setting menu screen. The AF method set using the AF method setting menu screen is recorded as a setting value in the nonvolatile memory 256. Hereinafter, changing the AF method corresponds to changing the setting value of the AF method that is recorded as a setting value in the nonvolatile memory 256.

Face AF refers to performing AF processing on a face region within the shooting screen that was detected by a face detecting function.

Here, the face detecting function of the present embodiment will be described. The system control unit 201 sends image data targeted for face detection to the image processing unit 224. The image processing unit 224 applies a horizontal band pass filter to the image data in accordance with an instruction from the system control unit 201. The image processing unit 224 also applies a vertical band pass filter to the processed image data. Due to such horizontal and vertical band pass filters, edge components are detected in the image data. Thereafter, the system control unit 201 performs pattern matching on the detected edge components, and extracts a group of candidates for eyes, a group of candidates for a nose and a group of candidates for a mouth. The system control unit 201 then determines, out of the extracted group of candidates for eyes, candidates that satisfy a preset condition (e.g., a distance between two eyes and inclination) as a pair of eyes, such that the extracted candidates for eyes are narrowed down to portions having a pair of eyes only, as a group of candidates for eyes. The system control unit 201 then associates the group of candidates for eyes obtained by the narrowing down to other features (a nose, a mouth, and ears) that correspond thereto and make up a face, and applies a preset non-face condition filter, thereby extracting face information. The system control unit 201 outputs the face information based on the face detection result and ends the processing. At this time, feature information such as the number of faces and the AF processing priority are stored in the system memory 252. By using the AF processing priority, a face targeted for AF can be designated. In addition, using the operation unit 270, an AF frame can be designated for any face that was detected in the face detection, and by performing touch-down on the display unit 101 as well, an AF frame can be designated for any face that was detected in the face detection. In the case where a face targeted for shooting is large in a live view, the face may not fit in the screen during enlarged display, and AF processing is restricted, whereby AF processing and a shooting operation may not be able to be performed while maintaining the enlarged display.

As described above, by performing image analysis on a live view or image data that is being reproduced and displayed, it is possible to extract feature amounts of the image data and extract object information. In the present embodiment, the face information was an example of the object information, but besides that, the object information includes various types of information such as red eye determination, eye detection, closed-eye detection and smiling face detection.

Note that face AE, face FE, and face WB can be performed at the same time as face AF. Face AE refers to optimizing the exposure of the entire screen in accordance with the brightness of a detected face. Face FE refers to performing flash light adjustment centering on a detected face. Face WB refers to optimizing WB in the entire screen in accordance with the color of a detected face.

In the present embodiment, image capturing plane AF such as arbitrary single-point AF, multi-point AF and face AF was described as an AF method for image data within a shooting screen. These types of image capturing plane AF can be realized using either a contrast AF method or a phase difference AF method.

Conventional AF Processing During Enlarged Display

Next, before describing AF processing according to the first embodiment, conventional AF processing during enlarged display will be described with reference to FIGS. 3A to 3C and FIGS. 4A to 4C.

First, screen transition during multi-point AF will be described with reference to FIGS. 3A to 3C.

Figure 3A:
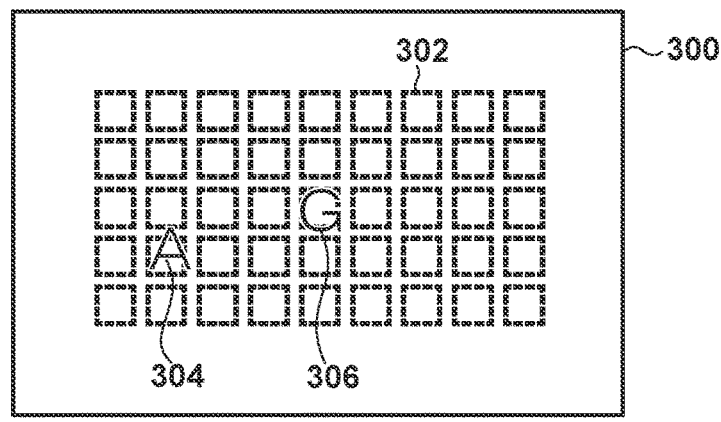
FIGS. 3A to 3C are diagrams for describing conventional AF processing and screen transition when performing multi-point AF during enlarged display.
Figure 3B:
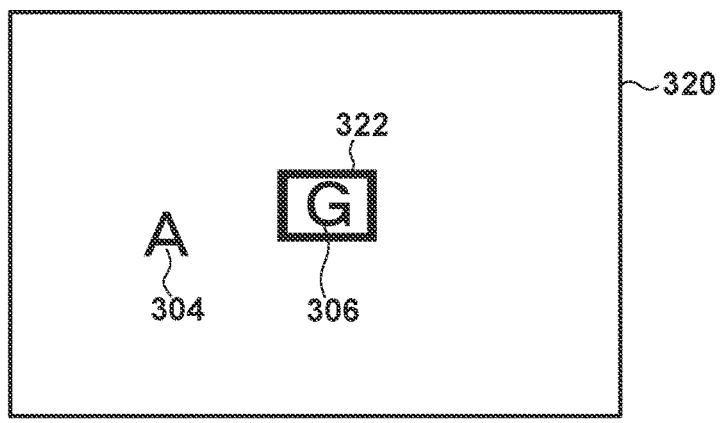
Figure 3C:

FIG. 3A illustrates an unmagnified screen 300. AF frames 302 are arranged at equal intervals in the screen. Assume that each of alphabetical letters 304 and 306 represents one object.

When the enlargement button 111 is pressed during such unmagnified display, a first enlarged screen that is enlarged at a predetermined first magnification (for example, five times) is displayed. FIG. 3B illustrates a first enlarged screen 320 obtained by enlarging the unmagnified screen 300 in FIG. 3A. An enlarged frame 322 shows an object targeted for display, and the object can be changed to another object using the cross key 108.

When the enlargement button 111 is further pressed during such enlarged display, an enlarged screen that is enlarged at a predetermined second magnification (for example, ten times) is displayed. FIG. 3C illustrates a second enlarged screen 340 obtained by further enlarging the enlarged frame 322 in FIG. 3B.

When the enlargement button 111 is pressed during such enlarged display, the screen is returned to the unmagnified screen 300.

In the case where the user performs a shooting preparation instruction on the second enlarged screen 340, the second enlarged screen 340 does not include all the AF frames 302 that exist in the unmagnified screen 300, and AF processing is performed on a limited portion of AF frames. Therefore, switching is performed from the enlarged screen 340 to the unmagnified screen 300 and AF processing is performed, and then a shooting operation is performed.

Next, screen transition during face AF will be described with reference to FIGS. 4A to 4C.

Figure 4A:
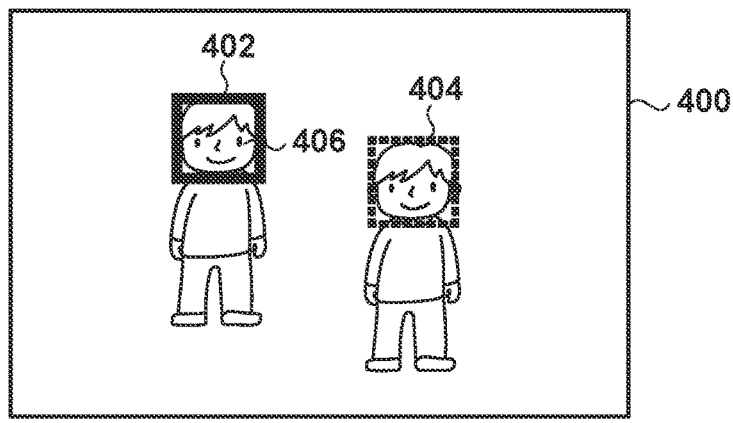
FIGS. 4A to 4C are diagrams for describing conventional AF processing and screen transition when performing face AF during enlarged display.
Figure 4B:
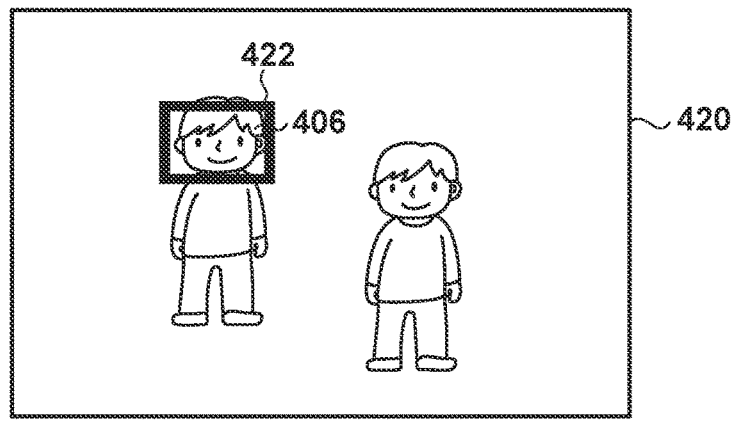
Figure 4C:
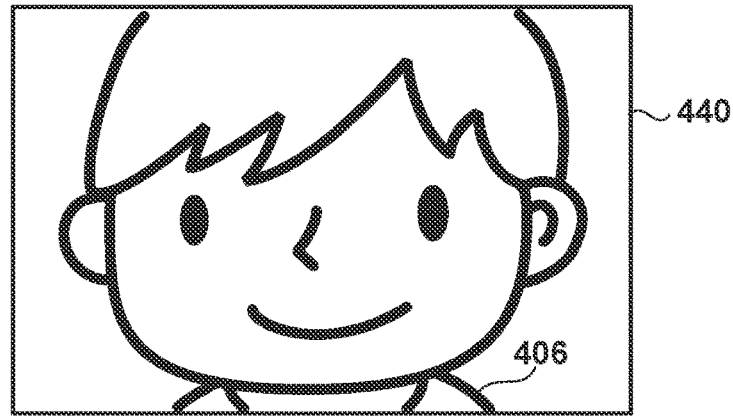

FIG. 4A illustrates an unmagnified screen 400. AF frames 402 and 404 are displayed so as to surround a face region within a shooting screen that was detected by performing the face detecting function. Priority is set for the AF frames in accordance with information such as the size of a face region and recognizability, and in FIG. 4A, the AF frame 402 is displayed as a black frame corresponding to a primary face having a high priority, and the AF frame 404 is displayed as a dotted frame corresponding to a secondary face having a low priority. The object region is the face region 406 that was recognized as the primary face.

When the enlargement button 111 is pressed during such unmagnified display, a first enlarged screen that is enlarged at a predetermined first magnification (for example, five times) is displayed. FIG. 4B illustrates a first enlarged screen 420 obtained by enlarging the unmagnified screen 400 in FIG. 4A. An enlarged frame 422 indicates a face region targeted for display, and the face region can be changed to another face region using the cross key 108.

When the enlargement button 111 is further pressed during such enlarged display, a second enlarged screen that is enlarged at a predetermined second magnification (for example, ten times) is displayed. FIG. 4C illustrates a second enlarged screen 440 obtained by further enlarging the enlarged frame 422 in FIG. 4B.

When the enlargement button 111 is pressed during such enlarged display, the screen is returned to the unmagnified screen 400.

In the case where the user gives a shooting preparation instruction during display of the second enlarged screen 440, the second enlarged screen 440 does not include all the face regions (AF frames) that exist in the unmagnified screen 400, in most cases, and AF processing is performed on a limited portion of AF frames. In addition, in the second enlarged screen 440 in FIG. 4C, a face region 406 does not fit in the shooting screen in some cases, thereby making it difficult to perform AF processing at high accuracy. Therefore, switching is performed from the second enlarged screen 440 to the unmagnified screen 400 and AF processing is performed, and then a shooting operation is performed.

As described above, in a conventional configuration, an AF method other than an arbitrary single-point AF method (multi-point AF or face AF) is set, and in the case where the live view screen is enlarged and displayed, before executing shooting, the enlarged display is released, switching is performed to unmagnified display, and AF processing (an AF executing instruction) is performed. Therefore, in the case where it is desired to perform shooting while maintaining the enlarged display, it is necessary to temporarily change the AF method to the arbitrary single-point AF method, thus making the setting operation complicated.

AF Processing During Enlarged Display

Next, AF processing during enlarged display in a live view according to the first embodiment will be described with reference to FIG. 5.

The AF method is set not to arbitrary single-point AF but to multi-point AF or face AF using the operation unit 270, and the processing of this flowchart is started by operating the live view button 110 using live view display as a trigger. In addition, the processing of this flowchart is realized by loading a program recorded in the nonvolatile memory 256 to the system memory 252 and the system control unit 201 executing the program. The same applies to FIGS. 6A and 6B that will be described later.

In step S502, in a state where a live view image is displayed on the display unit 101 (in a state where live view display is performed), the system control unit 201 determines whether or not enlarged display has been instructed using the enlargement button 111. In the case where it is determined as a result of the determination that an enlargement instruction was given, the procedure is advanced to step S503, and otherwise the procedure is advanced to step S505.

In step S503, the system control unit 201 displays an enlarged screen that is enlarged at a predetermined magnification (for example, five times or ten times).

In step S504, the system control unit 201 changes the AF method to arbitrary single-point AF.

In step S505, the system control unit 201 determines whether or not the first shutter switch signal SW1 has been turned on by half-pressing the shutter button 102. In the case where it has been turned on, the procedure is advanced to step S506, and otherwise the procedure is advanced to step S510.

In step S506, the system control unit 201 executes AF processing, based on an AF method that was set during the live view or the AF method changed to in step S504.

In step S507, the system control unit 201 determines whether or not the second shutter switch signal SW2 has been turned on by fully-pressing the shutter button 102. In the case where it has been turned on, the procedure is advanced to step S508, and otherwise the procedure is advanced to step S509.

In step S508, the system control unit 201 executes shooting processing.

In step S509, the system control unit 201 determines whether or not the first shutter switch signal SW1 is maintained in an on state by half-pressing the shutter button 102. In the case of an on state, the procedure is returned to step S506, and in the case where it is not maintained in an on state, the procedure is advanced to step S513.

In step S510, the system control unit 201 determines whether or not a touch-down operation has been performed on the display unit 101 (touch panel). In the case where a touch-down operation has been performed, the procedure is advanced to step S511, and in the case where a touch-down operation has not been performed, the procedure is advanced to step S513.

In step S511, the system control unit 201 executes AF processing based on the AF method that is set (the AF method that was set on the AF method setting screen if the AF method was not changed in step S504, or the AF method that was changed to if the AF method was changed in step S504).

In step S512, the system control unit 201 executes shooting processing.

In step S513, the system control unit 201 determines whether or not ending of the live view has been instructed by pressing down the live view button 110. In the case where an end instruction has been given, the procedure is advanced to step S514, and otherwise the procedure is returned to step S502.

In step S514, the system control unit 201 returns the AF method that was changed to in step S504 to the AF method before being changed.

In step S515, the system control unit 201 ends the live view.

According to the above processing, in the case where the AF method is set not to arbitrary single-point AF but to a multi-point AF method or a face AF method, and there is a desire to shoot during enlarged display in a live view, the AF method is changed to arbitrary single-point AF, and thus it becomes possible to perform AF processing and shooting while maintaining the enlarged display, without releasing the enlarged display and switching to the unmagnified screen. In addition, during the enlarged display, by automatically setting the AF method to arbitrary single-point AF, it is possible to resolve the troublesomeness of the operation of the user changing the settings of the AF method, returning the AF method to the original AF method, and the like.

Second Embodiment

Next, a second embodiment will be described.

The above first embodiment has a configuration in which the AF method is set not to arbitrary single-point AF but to multi-point AF or face AF, and during enlarged display in a live view, the AF method is automatically changed to arbitrary single-point AF. On the other hand, the present embodiment relates to AF processing in the case where it is possible to give two types of shooting instructions (AF executing instructions), namely, a shooting operation in accordance with a touch-down operation on the display unit 101, and a shooting operation in accordance with an operation of the shutter button 102.

In the case of the shooting instruction given by a touch-down operation during enlarged display, a region that is being enlarged and displayed is touched, and thus it is intuitively thought that the object in the enlarged and displayed screen is intended to be shot. On the other hand, in the case of the shooting instruction given by a shutter button operation during enlarged display, unlike the shooting operation in accordance with a touch-down operation, it is not thought that the object in the screen that is enlarged and displayed is necessarily intended to be shot. Therefore, it is thought that in some cases, multi-point AF in the original live view is preferably given priority.

In view of this, in the second embodiment, shooting is performed based on an AF method suitable for each of the shooting instruction given by a touch-down operation and the shooting instruction performed by a shutter button operation.

AF processing during enlarged display in a live view according to the second embodiment will be described with reference to FIGS. 6A and 6B.

Figure 6A:
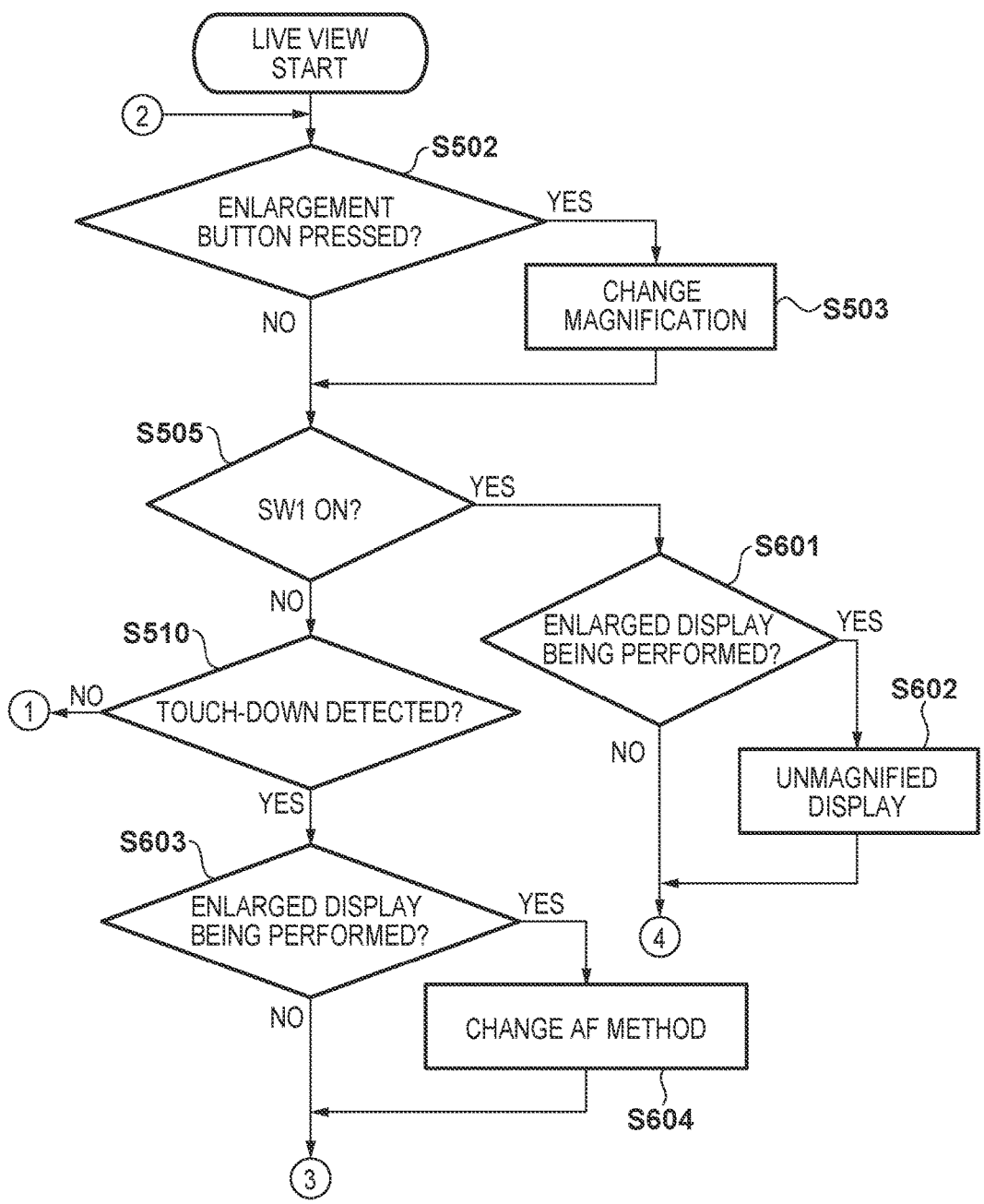
FIGS. 6A and 6B are flowcharts showing a shooting operation during enlarged display in a live view according to a second embodiment.
Figure 6B:
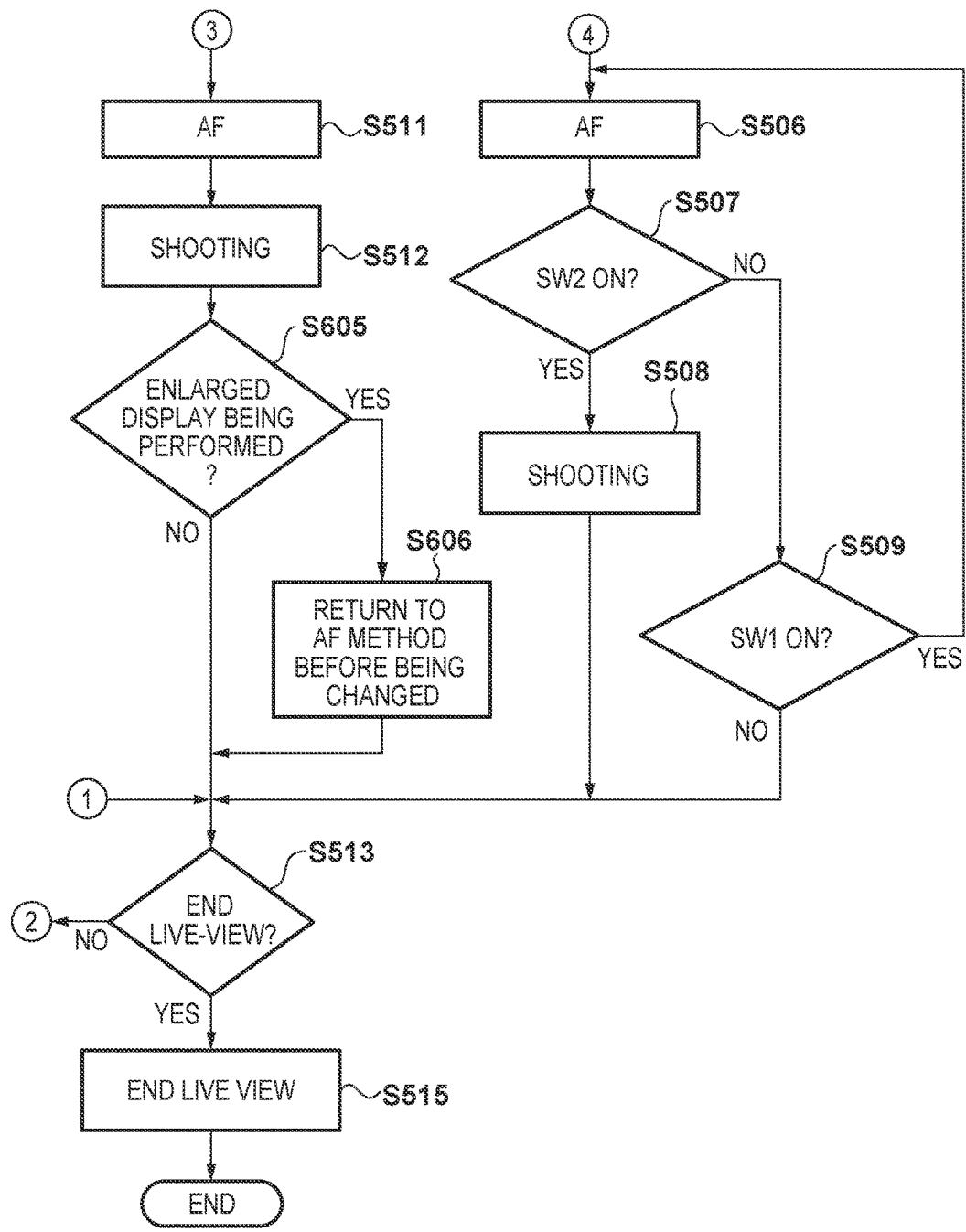

Note that the configuration of the camera 100 for realizing the processing in FIGS. 6 A and 6B is the same as that in FIG. 1A to FIG. 2 of the first embodiment. In addition, in FIGS. 6A and 6B, the same reference signs are given to the processing steps same as those in FIG. 5, and the differences will be mainly described.

In FIGS. 6A and 6B, the processing of step S603 onward corresponds to a shooting operation that is in accordance with a touch-down operation, and the processing of step S601 onward corresponds to a shooting operation that is in accordance with a shutter button operation.

First, the shooting operation in accordance with a touch-down operation will be described.

In step S603, the system control unit 201 determines whether or not enlarged display is being performed. In the case where enlarged display is being performed, the procedure is advanced to step S604, and otherwise the procedure is advanced to step S511.

In step S604, the system control unit 201 changes the AF method to arbitrary single-point AF.

In step S511, the system control unit 201 performs AF based on the AF method that is set (the AF method that was set on the AF method setting screen if the AF method was not changed in step S604, or the AF method that was changed to if the AF method was changed in step S604). In step S512, the system control unit 201 executes shooting processing.

After that, in step S605, the system control unit 201 determines whether or not enlarged display is being performed. In the case where enlarged display is being performed, the procedure is advanced to step S606, and otherwise the procedure is advanced to step S513.

In step S606, the system control unit 201 returns the AF method that was changed to in step S604 to the AF method before being changed, and thereafter performs the processing of step S513 and the processing of step S515.

Next, the shooting operation in accordance with a shutter button operation will be described.

In step S601, the system control unit 201 determines whether or not enlarged display is being performed. In the case where enlarged display is being performed, the procedure is advanced to step S602, and otherwise the procedure is advanced to step S506.

In step S602, the system control unit 201 switches the enlarged display to unmagnified surface display, and then executes AF processing and shooting processing of step S506 onward.

According to the above-described processing, in the case where the AF method is set not to arbitrary single-point AF but to the multi-point AF method or the face AF method, and there is a desire to shoot during enlarged display in a live view, the AF method is changed to arbitrary single-point AF when an AF executing instruction is given by a touch operation, and thus it becomes possible to perform AF processing and shooting while maintaining the enlarged display without releasing the enlarged display and switching to the unmagnified screen. In addition, in the case where an AF executing instruction is given by a touch operation during enlarged display, the AF method is automatically changed to arbitrary single-point AF, and thus it is possible to resolve the troublesomeness of the operation of the user changing the settings of the AF method and returning the AF method to the original AF method.

Note that an example was described with reference to FIGS. 6A and 6B, in which even in the case where the AF method is set not to arbitrary single-point AF but to the multi-point AF method or the face AF method, arbitrary single-point AF is performed in accordance with an AF executing instruction given by a touch operation during enlarged display, but a configuration may be adopted in which arbitrary single-point AF is not necessarily performed in accordance with an AF executing instruction given by a touch operation during enlarged display. For example, a configuration may be adopted in which in the case where an AF executing instruction is given by a touch operation during enlarged display, the user can set in advance using a menu screen or the like whether AF is to be performed based on the AF method that was originally set (including the multi-point AF method and the face AF method, but not arbitrary single-point AF), or arbitrary single-point AF is to be performed regardless of the originally set AF method. In that case, if settings were made such that AF is to be performed based on the AF method that was originally set, when an AF executing instruction is performed by a touch operation during enlarged display, AF is performed based on the AF method that was originally set (including the multi-point AF method and the face AF method, but not arbitrary single-point AF). In the case where settings were made such that arbitrary single-point AF is to be performed regardless of the AF method that was originally set, when an AF executing instruction is given by a touch operation during enlarged display, the above-described control in FIGS. 6A and 6B is performed. In addition, a configuration may be adopted in which along with the enlarged live view image, a button icon for instructing AF execution (an AF icon or a shooting instruction icon) is displayed, and in the case where this button icon is touched, AF is performed based on the AF method that was originally set (including the multi-point AF method and the face AF method, but not arbitrary single-point AF), and in the case where the live view image is touched, single-point AF is performed at the touched position. In any of the cases, if AF is performed based on the originally set AF method in accordance with a touch operation during enlarged display, and in the case where AF is performed based not on arbitrary single-point AF, but based on an AF method, enlargement is released and AF is performed, similarly to half-pressing of the shutter button 102.

Note that control performed by the system control unit 201 may be performed by a single item of hardware, or the entire apparatus may be controlled by a plurality of items of hardware sharing processing.

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate.

Although the above embodiments have described an example in which the present invention is applied to an image capturing apparatus such as a digital camera, the present invention is not limited to this example. The present invention is applicable to, for example, an apparatus having a plurality of AF methods and capable of performing an enlarged display of a screen during live viewing. More specifically, the present invention is applicable to a camera-equipped personal computer, a tablet terminal which is a kind of a personal computer, a mobile telephone terminal, a smart phone which is a kind of a mobile telephone terminal, a PDA (Personal Digital Assistant), a mobile image viewer, a music player, a game console, an electronic book reader, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-126870, filed Jun. 24, 2015 which is hereby incorporated by reference herein in its entirety.

What is claimed is:

1. An image capture control apparatus comprising:
at least one processor; and
a memory having stored thereon instructions which, when executed by the at least one processor, cause the image capture control apparatus to:
perform control so as to display, on a display, a live view image captured by an image capture apparatus in any of a plurality of display states that include normal magnification display and enlarged display that is enlarged more than the normal magnification display,
perform control so as to, in a case where a first operation is performed during the enlarged display of the live view image, switch to the normal magnification display and execute auto focus (AF) processing based on a first AF method,
in a case where a second operation is performed during the enlarged display of the live view image, maintain the enlarged display and execute AF processing based on a second AF method, and
perform control so as to execute AF processing based on the first AF method both in a case where the first operation is performed and in a case where the second operation is performed during the normal magnification display of the live view image.

2. The apparatus according to claim 1, wherein the instructions, when executed by the at least one processor, further cause the image capture control apparatus to:
set an AF method selected by a user among a plurality of AF methods including the first AF method and the second AF method,
perform control so as to, in a case where the first AF method has been set and the first operation is performed during the enlarged display of the live view image, switch to the normal magnification display and execute AF processing based on the first AF method, and
in a case where the first AF method has been set and the second operation is performed during the enlarged display of the live view image, maintain the enlarged display and execute AF processing based on the second AF method.

3. The apparatus according to claim 2, wherein the instructions, when executed by the at least one processor, further cause the image capture control apparatus to
perform control so as to, in a case where the first AF method has been set and the second operation is performed during the enlarged display of the live view image, change a setting made to the second AF method, execute AF processing based on the second AF method while maintaining the enlarged display, and thereafter return the setting made to the first AF method.

4. The apparatus according to claim 1, wherein
the first operation is an operation performed on a first operation member, and the second operation is an operation performed on a second operation member different from the first operation member.

5. The apparatus according to claim 4, wherein
the first operation member is a shutter button.

6. The apparatus according to claim 5, wherein
the second operation member is a touch panel.

7. The apparatus according to claim 6, wherein
the second operation is a touch operation performed on a live view image displayed on the touch panel, and
the instructions, when executed by the at least one processor, further cause the image capture control apparatus to perform control so as to perform AF processing on an object corresponding to a touched position as an AF target in accordance with the second operation.

8. The apparatus according to claim 1, wherein the second AF method is single-point AF.

9. The apparatus according to claim 1, wherein the first AF method is at least one of multi-point AF or face AF.

10. The apparatus according to claim 1, wherein the instructions, when executed by the at least one processor, further cause the image capture control apparatus to perform control so as to not perform, in accordance with the first operation, shooting processing that is a series of processing from image capturing to recording of an image file to a recording medium, and to perform AF processing as well as the shooting processing in accordance with the second operation.

11. The apparatus according to claim 10, wherein the first operation is half-pressing of a shutter button, and the instructions, when executed by the at least one processor, further cause the image capture control apparatus to perform control so as to perform the shooting processing in accordance with full-pressing of the shutter button.

12. The apparatus according to claim 1, further comprising the image capture apparatus.

13. A control method of an image capture control apparatus, the method comprising:
performing control so as to display, on a display, a live view image captured by an image capture apparatus in any of a plurality of display states that include normal magnification display and enlarged display that is enlarged more than the normal magnification display;
performing control so as to, in a case where a first operation is performed during the enlarged display of the live view image, switch to the normal magnification display and execute auto focus (AF) processing based on a first AF method;
in a case where a second operation is performed during the enlarged display of the live view image, maintaining the enlarged display and execute AF processing based on a second AF method; and
performing control so as to execute AF processing based on the first AF method both in a case where the first operation is performed and in a case where the second operation is performed during the normal magnification display of the live view image.

14. A non-transitory computer-readable storage medium storing a program that, when executed, causes a computer to perform a method for controlling a display and an image capture apparatus, the method comprising:
performing control so as to display, on a display, a live view image captured by an image capture apparatus in any of a plurality of display states that include normal magnification display and enlarged display that is enlarged more than the normal magnification display;
performing control so as to, in a case where a first operation is performed during the enlarged display of the live view image, switch to the normal magnification display and execute auto focus (AF) processing based on a first AF method;
in a case where a second operation is performed during the enlarged display of the live view image, maintaining the enlarged display and execute AF processing based on a second AF method; and
performing control so as to execute AF processing based on the first AF method both in a case where the first operation is performed and in a case where the second operation is performed during the normal magnification display of the live view image.

15. An image capture control apparatus comprising:
at least one processor; and
a memory having stored thereon instructions which, when executed by the at least one processor, cause the image capture control apparatus to:
perform control so as to display, on a display, a live view image captured by an image capture apparatus in any of a plurality of display states that include normal magnification display and enlarged display that is enlarged more than the normal magnification display,
perform control so as to, in a case where a first operation is performed during the enlarged display of the live view image, switch to the normal magnification display and execute auto focus (AF) processing based on a first AF method, and
in a case where a second operation is performed during the enlarged display of the live view image, maintain the enlarged display and execute AF processing based on a second AF method,
wherein the first operation is an operation performed on a first operation member, and the second operation is an operation performed on a second operation member different from the first operation member.

16. The apparatus according to claim 15, wherein the first operation member is a shutter button.

17. The apparatus according to claim 16, wherein the second operation member is a touch panel.

18. The apparatus according to claim 17, wherein the second operation is a touch operation performed on a live view image displayed on the touch panel, and the instructions, when executed by the at least one processor, further cause the image capture control apparatus to perform control so as to perform AF processing on an object corresponding to a touched position as an AF target in accordance with the second operation.

19. A control method of an image capture control apparatus, the method comprising:
performing control so as to display, on a display, a live view image captured by an image capture apparatus in any of a plurality of display states that include normal magnification display and enlarged display that is enlarged more than the normal magnification display;
performing control so as to, in a case where a first operation is performed during the enlarged display of the live view image, switch to the normal magnification display and execute auto focus (AF) processing based on a first AF method; and
in a case where a second operation is performed during the enlarged display of the live view image, maintain the enlarged display and execute AF processing based on a second AF method,
wherein the first operation is an operation performed on a first operation member, and the second operation is an operation performed on a second operation member different from the first operation member.

20. A non-transitory computer-readable storage medium storing a program that, when executed, causes a computer to perform a method for controlling a display an image capture apparatus, the method comprising:
performing control so as to display, on a display, a live view image captured by an image capture apparatus in any of a plurality of display states that include normal magnification display and enlarged display that is enlarged more than the normal magnification display;

performing control so as to, in a case where a first operation is performed during the enlarged display of the live view image, switch to the normal magnification display and execute auto focus (AF) processing based on a first AF method; and
in a case where a second operation is performed during the enlarged display of the live view image, maintaining the enlarged display and execute AF processing based on a second AF method,
wherein the first operation is an operation performed on a first operation member, and the second operation is an operation performed on a second operation member different from the first operation member.

* * * * *